(12) United States Patent
Wojewodzki

(10) Patent No.: US 9,573,641 B2
(45) Date of Patent: Feb. 21, 2017

(54) BICYCLE SEAT

(71) Applicant: Jan Wojewodzki, St-Bruno (CA)

(72) Inventor: Jan Wojewodzki, St-Bruno (CA)

( * ) Notice: Subject to any disclaimer, the term of this patent is extended or adjusted under 35 U.S.C. 154(b) by 0 days.

(21) Appl. No.: 14/392,038

(22) PCT Filed: Oct. 16, 2013

(86) PCT No.: PCT/CA2013/000897
§ 371 (c)(1),
(2) Date: Apr. 14, 2015

(87) PCT Pub. No.: WO2014/059531
PCT Pub. Date: Apr. 24, 2014

(65) Prior Publication Data
US 2016/0001835 A1 Jan. 7, 2016

(30) Foreign Application Priority Data

Oct. 18, 2012 (CA) ..................................... 2792651

(51) Int. Cl.
| | |
|---|---|
| *B62J 1/02* | (2006.01) |
| *B62J 1/04* | (2006.01) |
| *B62J 1/10* | (2006.01) |
| *B62J 1/00* | (2006.01) |

(52) U.S. Cl.
CPC .. *B62J 1/10* (2013.01); *B62J 1/00* (2013.01); *B62J 1/02* (2013.01); *B62J 1/04* (2013.01)

(58) Field of Classification Search
CPC ................. B62J 1/002; B62J 1/02; B62J 1/04; B62J 1/10; B60N 2/39

USPC .................................. 297/195.1, 201, 215.15
See application file for complete search history.

(56) References Cited

U.S. PATENT DOCUMENTS

| | | | | |
|---|---|---|---|---|
| 2,731,074 | A * | 1/1956 | Steinle ...................... | B60N 2/39 248/371 |
| 5,286,082 | A * | 2/1994 | Hanson .................... | B62J 1/007 297/195.1 |
| 6,942,290 | B1* | 9/2005 | Gootter ...................... | B62J 1/00 297/195.1 |
| 2004/0239159 | A1* | 12/2004 | Muscat .................... | B62J 1/007 297/215.15 |
| 2007/0164590 | A1* | 7/2007 | Hsiao ......................... | B62J 1/08 297/215.15 |
| 2007/0182225 | A1* | 8/2007 | Bigolin ...................... | B62J 1/08 297/215.13 |
| 2012/0242119 | A1* | 9/2012 | Bigolin ...................... | B62J 1/00 297/195.1 |

(Continued)

FOREIGN PATENT DOCUMENTS

| | | | | |
|---|---|---|---|---|
| DE | | 824749 C | * 12/1951 | ................ B62J 1/02 |
| DE | | 2049273 A1 | * 4/1972 | ................ B62J 1/02 |

(Continued)

*Primary Examiner* — Ryan Kwiecinski
(74) *Attorney, Agent, or Firm* — Eric Fincham

(57) ABSTRACT

A seat assembly (10) for a bicycle, the seat assembly (10) having a seat (34) and a mounting assembly (50) located proximate a front of the seat (34) and being connected thereto, a hub (22) for receiving mounting assembly (50) in a rotatable manner, the axis of rotation (88) being diagonal with respect to horizontal and vertical planes, the arrangement being such that the seat (34) can move from side to side, and a lower frame member (24) extending between the hub (22) and a seat post mounting element (12).

7 Claims, 4 Drawing Sheets

(56) References Cited

U.S. PATENT DOCUMENTS

2014/0132047 A1* 5/2014 Eldredge ................ B62J 1/005
                                                              297/201

FOREIGN PATENT DOCUMENTS

DE      202012002511 U1 *  5/2012  ................ B62J 1/04
GB            1312326 A  *  4/1973  ................ B62J 1/02

* cited by examiner

BICYCLE SEAT

FIELD OF THE INVENTION

The present invention relates to bicycle seats.

BACKGROUND OF THE INVENTION

Bicycle riders while pedalling tend to move the whole body sideways. Because a traditional bicycle seat has a fixed position relative to the frame it cannot move sideways together with rider's body and therefore, can be a major source of discomfort and perineal health issues. Some of the health problems include severe chafing of tissue in contact with the seat, restriction of blood flow through perinea area of the body, numbness as well as problems with reproductive organs.

The normal bicycle seat includes an elongated and narrow front portion with a wider rear portion. It has been advanced in the art that this arrangement is such as to wedge into the pubic part of the rider and force the left and right hip bones apart. This structure is believed to be bad both for the sexual function of the male and furthermore, it has been hypothesized that forcing the hip bones apart impinges on the sacroiliac joint of the rider.

In order to overcome this, many proposals in the art suggest a bifurcated seat which provides two support surfaces which are spaced apart. Coupled with this, arrangements have been proposed wherein the two seat portions can pivot so as to move upwardly and downwardly as the pedals are pushed.

While the above arrangement is more comfortable than the conventional seat, it is believed that having a bicycle seat which rotates in a plane angled with respect to the horizontal is more comfortable and suitable for the rider.

SUMMARY OF THE INVENTION

According to one aspect of the present invention, there is provided a seat assembly for a, bicycle, the seat assembly comprising a seat, a mounting assembly located proximate a front of the seat, the mounting assembly being connected to the seat, a hub, the mounting assembly being rotatably journalled in the hub, the axis of rotation of the mounting assembly extending diagonally with respect to horizontal and vertical planes, the arrangement being such that the seat can move from side to side, and a lower frame member, the lower frame member extending between the hub and a seat post mounting element.

According to the present invention, there is provided a bicycle seat which has a front sloping portion and a rear seat portion. The seat is mounted in a hub at an angle with respect to the horizontal such that the seat can move rotatably. With the rotatable movement, because of the angle, the seat will also move sideways, both left and right. When one side of the seat moves upwardly (forwardly) the other side of the seat moves downwardly (rearwardly). The angle of the axis of rotation can vary depending upon the particular design which is desired.

The seat could employ a conventional type of seat although according to the present invention, the seat is a one piece member which may include a plurality of apertures therein. The seat may be mounted and supported only at the front if desired. However, preferably a rear support arrangement is also provided.

As aforementioned, the seat is mounted at an angle with respect to the horizontal and vertical and is held in place by a mounting assembly which is rotatably journalled within the hub. Thus, the seat can rotate and in so doing, will move from side to side as well as having a forward and backward element of movement.

The mounting assembly preferably includes suitable bearings to permit the rotatable movement.

The seat assembly will include an arrangement where it is mounted on a conventional mounting post as is well known.

BRIEF DESCRIPTION OF THE DRAWINGS

Having thus generally described the invention, reference will now be made to the accompanying drawings, in which.

DETAILED DESCRIPTION OF THE INVENTION

Figure 1:
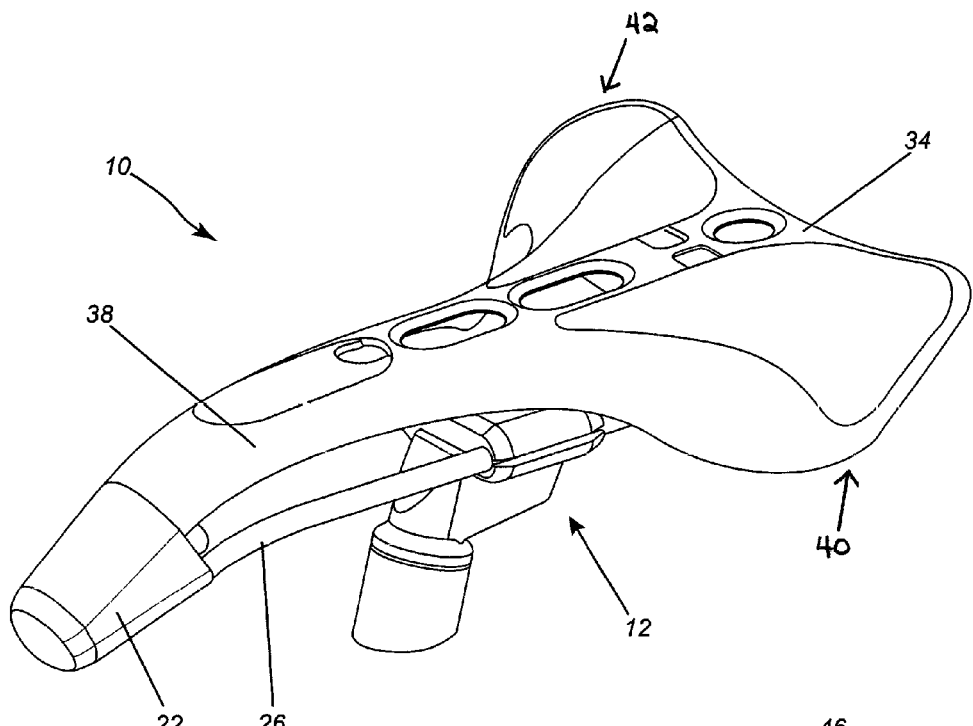
FIG. 1 is a perspective view of a bicycle seat according to an embodiment of the present invention.
Figure 2:
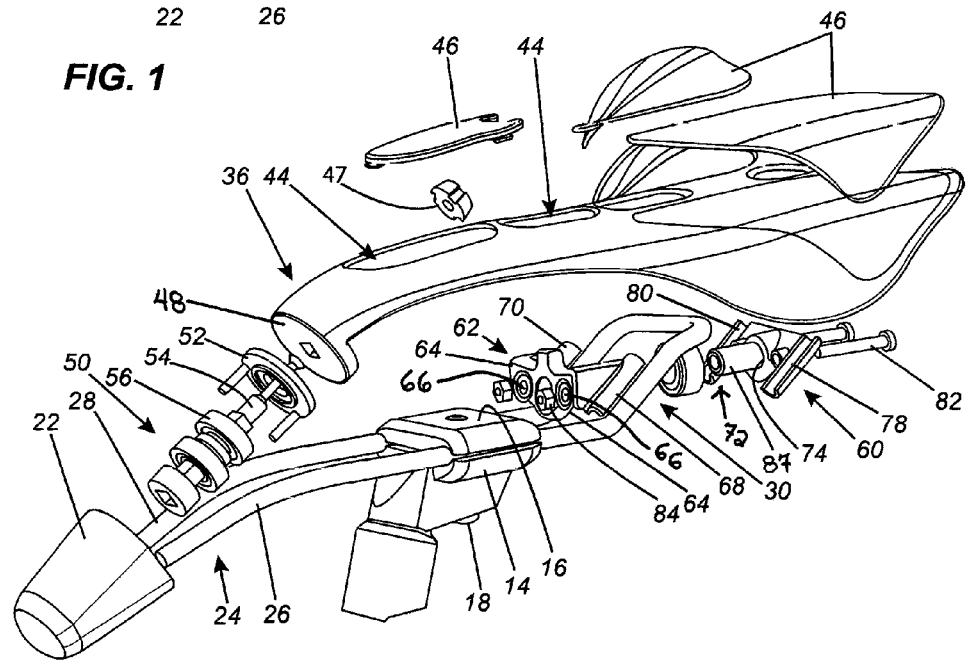
FIG. 2 is an exploded view thereof.

Referring to the drawings in greater detail and by reference characters thereto, there is illustrated a bicycle seat assembly which is generally designated by reference numeral 10. Bicycle seat assembly 10 has a seat post mounting member 12 which includes an aperture 15 designed to receive a bicycle seat post for mounting of bicycle seat assembly 10. Such shafts are conventional and are not shown herein. Suitable fastening means (not shown) will secure the attachment between the bicycle seat post and the seat post mounting member.

Figure 4:
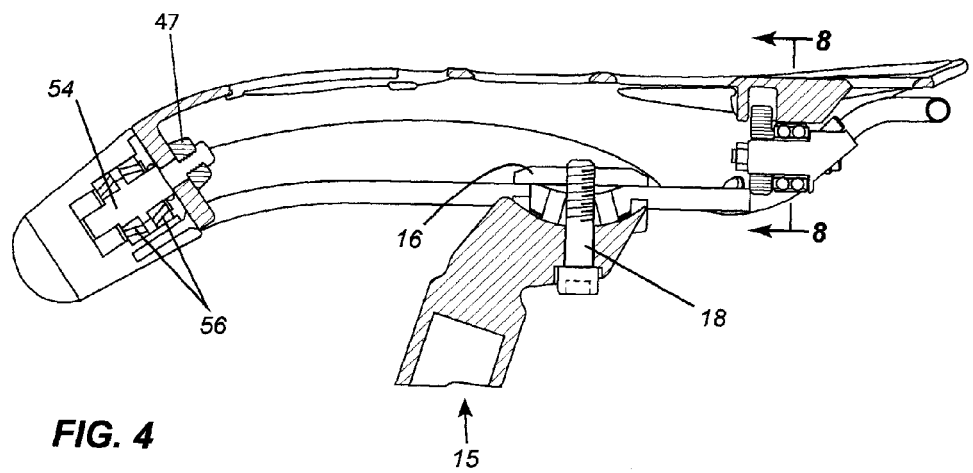
FIG. 4 is a longitudinal cross-sectional view thereof.
Figure 5:
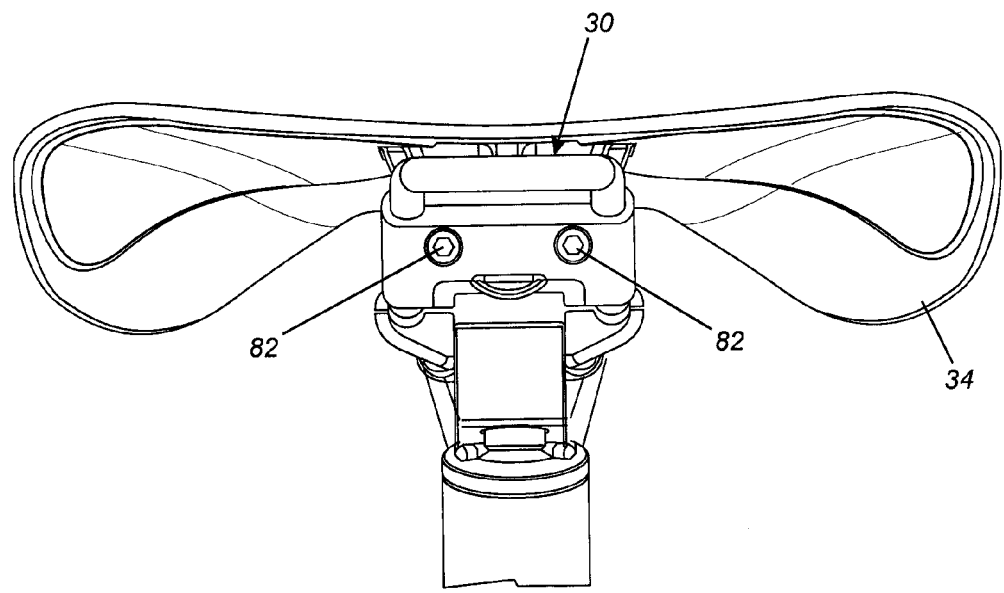
FIG. 5 is a rear view thereof.
Figure 6:
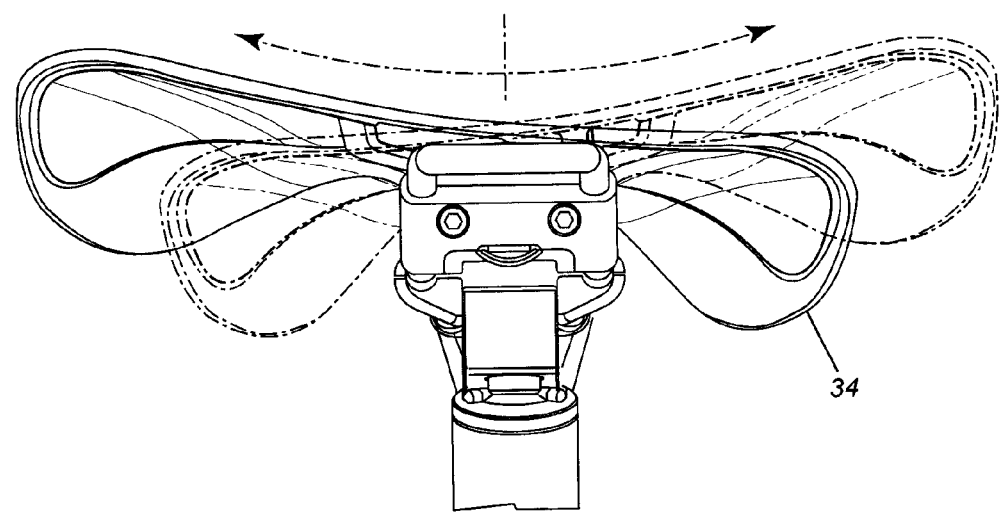
FIG. 6 is a rear view illustrating movement of the seat.

Mounting member 12 also includes a lower clamp element 14 and an upper clamp member 16 with a screwthreaded member 18 being provided to connect lower clamp member 14 and upper clamp member 16 together as may be seen in FIG. 4.

Bicycle seat assembly 10 includes a hub generally designated by reference numeral 22. Bicycle seat assembly 10 also includes an elongated frame generally designated by reference numeral 24 and which has an overall U-shaped configuration with a first leg 26 and a second leg 28. A rear section having the U-shape is provided rearwardly thereof and is designated by reference numeral 30. Clamps 14 and 16 secure seat post mounting member 12 to legs 26, 28 of elongated frame 24.

A seat 34 has a front portion 36 and a main body 38. Extending outwardly from main body 38 at a back end thereof are first and second wing portions 40, 42. A plurality of apertures 44 are provided in main body 38 to permit access to various mounting elements. Covers 46 are provided for covering apertures 44. Seat 34 may also have apertures formed therein including wing portions 40, 42.

Front portion 36 has a front wall 48 which is used for connecting a mounting assembly generally designated by reference numeral 50. Mounting assembly 50 includes a plate 52 and a center member 54 about which there are provided bearings 56 to allow for rotatable movement of the seat. It will be noted that the legs 26, 28 of elongated frame 24 are also mounted within hub 22. Locknut 47 secures the mounting assembly 50 in position.

The seat assembly also includes, in the illustrated embodiment a rear support assembly generally designated by reference numeral 60 and which includes a front element generally designated by reference numeral 62. Front element 62 has a body 64 with a pair of apertures 66 formed therein. Front element 62 also includes a pair of clamp halves 68, 70. A second rearwardly extending element 72 includes a body portion 74. A shaft 87 extends forwardly for reasons which will become clear hereinafter. A pair of clamp halves 78, 80 are provided for mating with like clamp halves 68, 70 respectively. Front element 62 and second element 72 are secured together about U-shaped section 30 by means of bolts 82 and nuts 84. A roller 86 is mounted on shaft 87 provided for mating with seat 34.

Figures 7, 8:
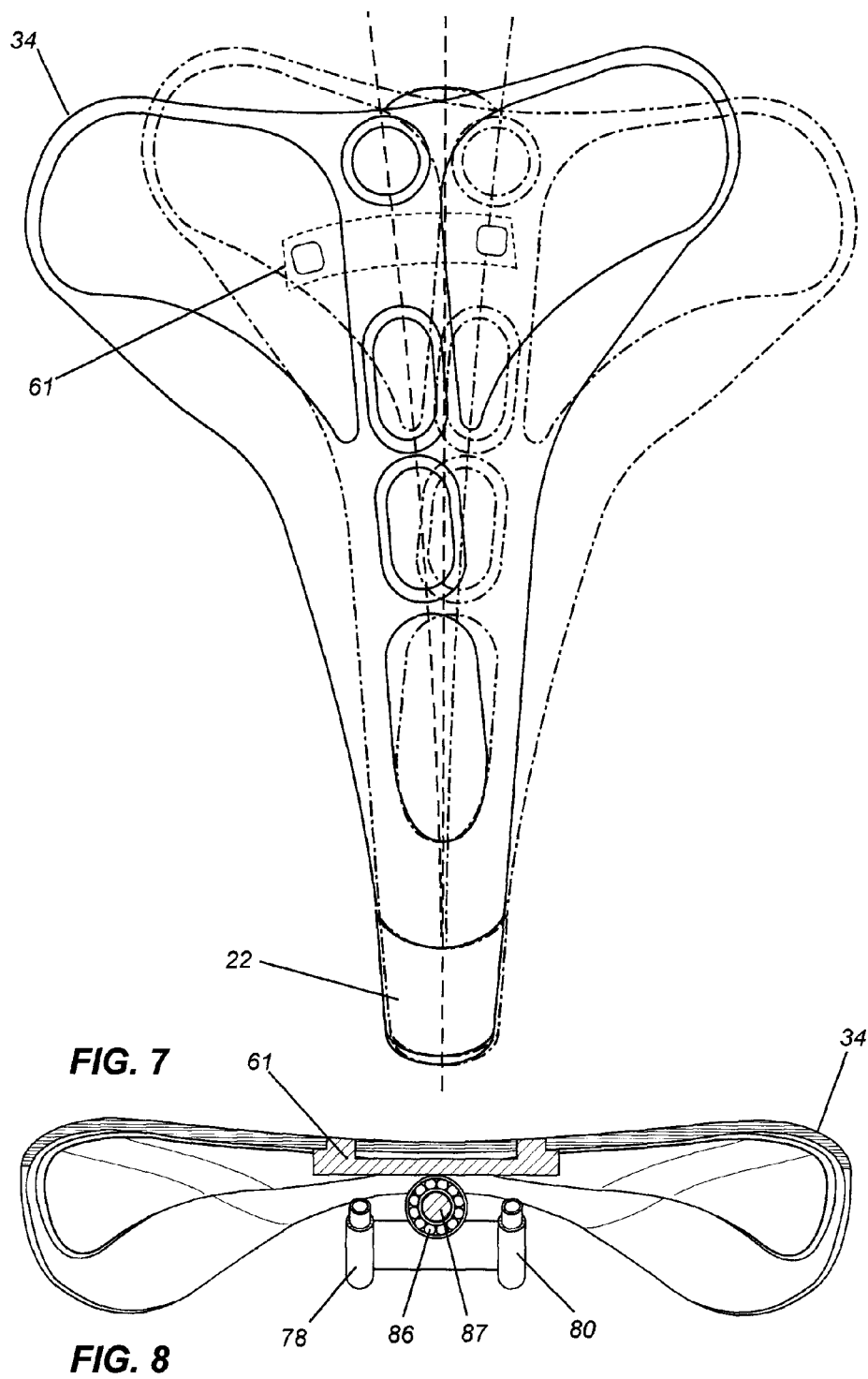
FIG. 7 is a top plan view illustrating seat movement during cycling.
FIG. 8 is a rear view.

Roller 86 follows a track 61 which is formed on the underside of seat 34. Track 61 may be seen in FIG. 7 and as will be noted, is arcuate in configuration to accommodate the rotation and tilting of seat 34. Roller 86 provides support for the rear portion of the seat. If desired, more than one roller could be utilized.

Figure 3:
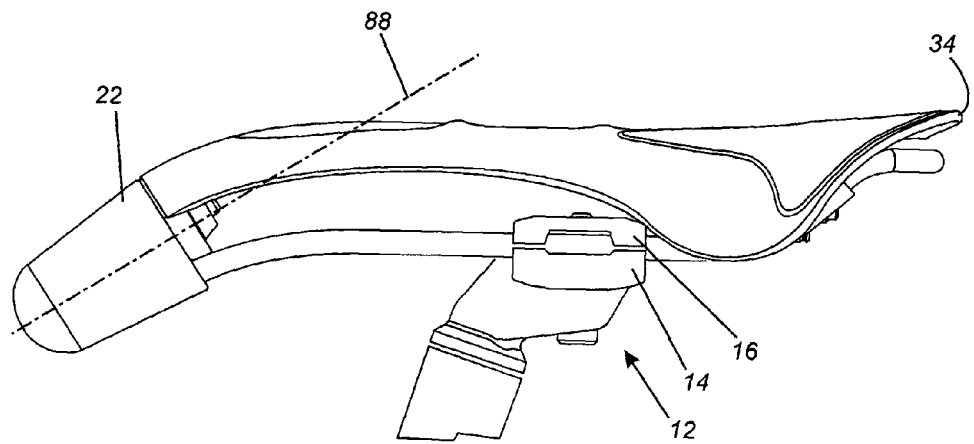
FIG. 3 is a side elevational view thereof.

As may be best seen in FIG. 3, the rotational movement of seat 34 occurs about an axis 88 which is angled with respect to a horizontal axis and a vertical axis.

I claim:

1. A seat assembly (10) for a bicycle, said seat assembly (10) comprising a seat (34), a mounting assembly (50) located proximate a front of said seat (34), said mounting assembly (50) being connected to said seat (34);
    a hub (22), said mounting assembly (50) being rotatably journalled in said hub (22), the axis of rotation (88) of said mounting assembly extending diagonally upwardly from a front of said seat to a rear of said seat with respect to horizontal and vertical planes such that said axis of rotation passes above said seat, wherein said seat is configured to move from side to side; and
    a lower frame member (24), said lower frame member (24) extending between said hub (22) and a seat post mounting element (12).

2. The seat assembly (10) of claim 1 wherein said lower frame member (24) has a portion extending rearwardly of said seat post mounting element (12).

3. The seat assembly (10) of claim 2 further including a support (60) for a rear portion of said seat (34) mounted on said portion of said rearwardly extending frame member (30).

4. The seat assembly of claim 1 wherein said seat (34) includes a plurality of apertures formed therein.

5. The seat assembly of claim 1 wherein said seat (34) has a front wall (48), said mounting assembly (50) being secured to said front wall (48).

6. A seat assembly (10) for a bicycle, said seat assembly (10) comprising a seat (34), a mounting assembly (50) located proximate the front of said seat (34), said mounting assembly (50) being connected to said seat (34);
    a hub (22), said mounting assembly (50) being rotatably journaled in said hub (22), the axis of rotation of said mounting assembly extending diagonally with respect to horizontal and vertical planes, wherein said seat is configured to move from side to side; and
    a lower frame member (24), said frame member (24) standing between said hub (22) and a seat post mounting element (12), said lower frame member (24) having a portion extending rearwardly of said seat post mounting element (12), a support (60) for a rear portion of said seat (34) mounted on said portion of said rearwardly extending frame member (30), a roller mounted on said support (60), said seat having a track (61) formed on an underside thereof, said track (61) having an arcuate configuration, said roller (86) moving within said track (61).

7. A seat assembly (10) for a bicycle, said seat assembly (10) comprising a seat (34), a mounting assembly (50) located proximate a front of said seat (34), said mounting assembly (50) being connected to said seat (34);
    a hub (22), said mounting assembly (50) being rotatably journaled in said hub (22), the axis of rotation of said mounting assembly extending diagonally with respect to horizontal and vertical planes, wherein said seat is configured to move from side to side; and
    a lower frame member (24), said lower frame member (24) extending between said hub (22) and a seat post mounting element (12), the seat (34) having a front wall (48), said mounting assembly (50) being secured to said front wall (48), said mounting assembly (50) including bearings (56) within said hub (22) to permit rotational movement of said mounting assembly (50) and seat (34).

\* \* \* \* \*